US005842260A

United States Patent [19]
Todd, III et al.

[11] Patent Number: 5,842,260

[45] Date of Patent: Dec. 1, 1998

[54] VALVE REMOVAL TOOL, GAS CYLINDER RECYCLE KIT, AND PROCESS FOR REMOVING VALVES FROM GAS CYLINDERS

[75] Inventors: Emerson G. Todd, III, Hurlock; George D. Baker, Cambridge; James F. Kampmeyer, Salisbury, all of Md.

[73] Assignee: Air Liquide America Corporation, Houston, Tex.

[21] Appl. No.: 858,046

[22] Filed: May 16, 1997

[51] Int. Cl.[6] .................................................. B23P 19/04

[52] U.S. Cl. ........................................................ 29/213.1

[58] Field of Search ................................ 29/213.1, 214, 29/890.121, 256, 257

[56] References Cited

U.S. PATENT DOCUMENTS

| | | | |
|---|---|---|---|
| Re. 27,895 | 1/1974 | Ray | 29/213.1 |
| 1,519,067 | 12/1924 | Smith | 29/256 |
| 3,755,876 | 9/1973 | Beasley | 29/890.121 |
| 4,706,357 | 11/1987 | Ewing | 29/213.1 |

*Primary Examiner*—Robert C. Watson
*Attorney, Agent, or Firm*—Burns, Doane, Swecker & Mathis, L.L.P.

[57] ABSTRACT

Compressed gas cylinder valve removal tools and a kit are disclosed. A body portion of the tools mate with a corresponding portion on a compressed gas cylinder valve assembly. A stem portion of the tools is advanced through the body portion and into the valve assembly of the compressed gas cylinder. A punch portion of the stem impinges against the valve of the valve assembly and punches out the valve into the compressed gas cylinder. A gas vent path is provided through the valve removal tool to allow residual gas within the compressed gas cylinder to escape through the tool to atmosphere while the valve is being punched out. In an alternative embodiment, the valve removal tool includes portions which mate with corresponding portions on a compressed gas cylinder valve, to unscrew the valve from the valve assembly. Once punched out or unscrewed, the valve will drop harmlessly into the compressed gas cylinder, ensuring that the compressed gas cylinder is fully vented to atmosphere and does not contain any residual gas therein.

17 Claims, 3 Drawing Sheets

Fig. 4
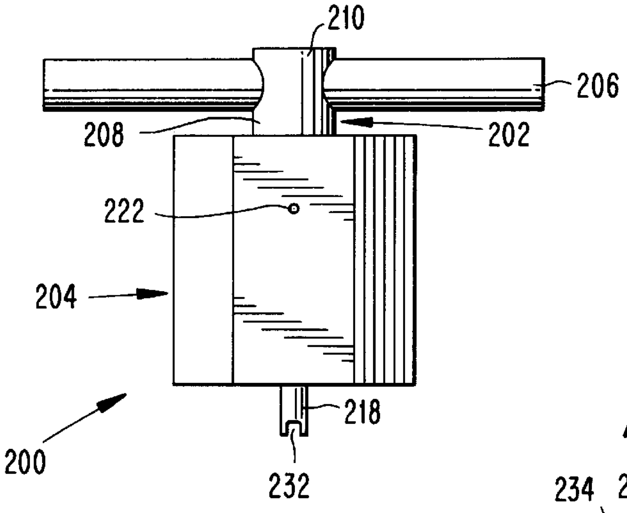
Fig. 5
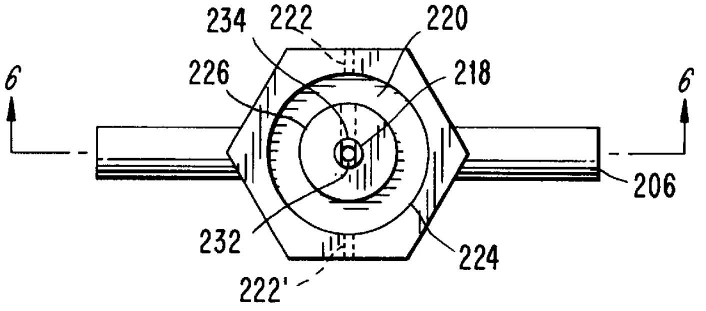
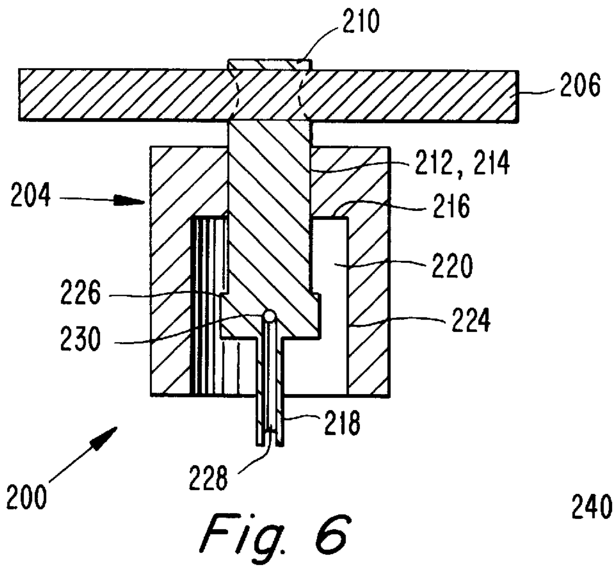
Fig. 6
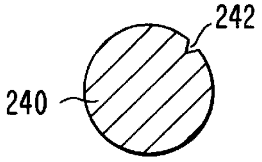
Fig. 7

Fig. 9
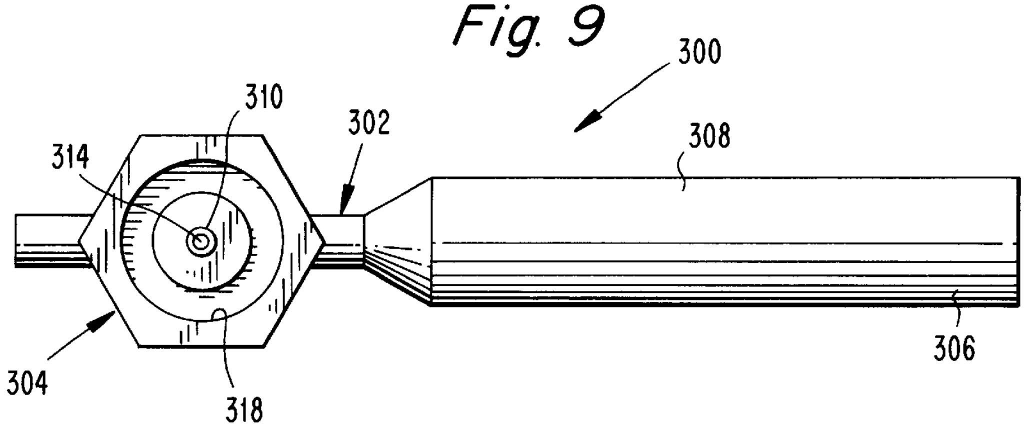
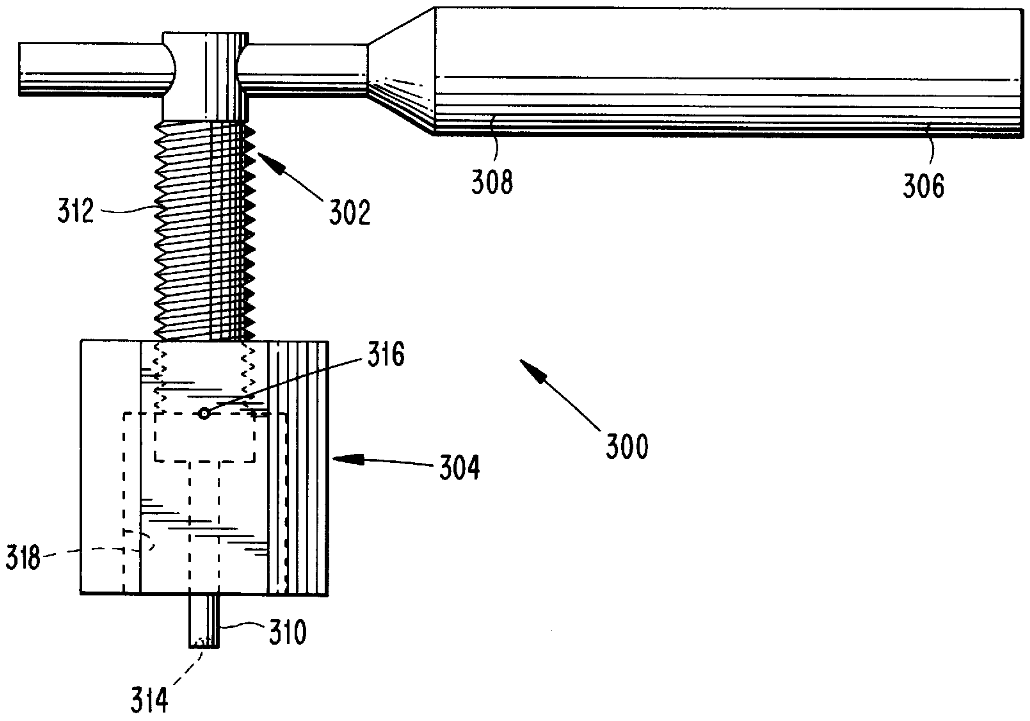
Fig. 8

VALVE REMOVAL TOOL, GAS CYLINDER RECYCLE KIT, AND PROCESS FOR REMOVING VALVES FROM GAS CYLINDERS

BACKGROUND OF THE INVENTION

1. Field of the Invention

The application relates to apparatus and processes for the safe removal of valves from compressed gas cylinders to ensure their safe disposal.

2. Brief Description of the Related Art

Compressed gas is typically packaged in a compressed gas cylinder which includes a valve assembly. Once the gas within a compressed gas cylinder has been used, it is desirable to recycle the empty compressed gas cylinder. Gas cylinders which are not to be refilled with compressed gas are classified as Non Refillable Cylinders (NRC). Such a NRC, however, is classified as hazardous material, because of the possibility of residual gas pressure remaining in the gas cylinder. Consequently, the transportation of used compressed gas cylinders is very costly. This cost inhibits the reuse and/or recycling of used compressed gas cylinders. Furthermore, even if a NRC is completely empty, prior to the present invention there has not been a simple method of determining that there is no residual gas pressure in the NRC, and therefore no simple way of ensuring that the NRC is truly empty and non-hazardous.

It is therefore an object of the present invention to provide an apparatus and method for rendering used compressed gas cylinders completely empty of gas, which will therefore allow them to be transported as inexpensive, non-hazardous material.

It is yet another object of the present invention to provide an apparatus and process for the safe and efficient removal of valves from compressed gas cylinders, to ensure that there is no more residual gas remaining in the gas cylinder.

It is yet another object of the invention to provide an apparatus and process for providing visual evidence that a compressed gas cylinder contains no residual gas pressure.

SUMMARY OF THE INVENTION

In accordance with the foregoing objectives, the present invention provides a gas cylinder valve removal tool comprising a body portion including a bore extending therethrough, the body portion including means for mounting said body portion on a gas cylinder valve assembly. A stem portion is sized to be received in the body. Advancement of the stem portion relative to the body portion, when the body portion is mounted on a gas cylinder valve assembly, removes a valve from the valve assembly.

According to another embodiment according to the present invention, a gas cylinder valve removal kit comprises first and second gas cylinder valve removal tools. A first gas cylinder valve removal tool includes a body portion including a bore extending therethrough, the body portion including means adapted for mounting the body portion on a gas cylinder valve assembly, and a stem portion sized to be received in the bore and including a pin adapted to engage and punch out the valve. Advancement of the stem portion relative to the body portion, when the body portion is mounted on a gas cylinder valve assembly, removes a valve from the valve assembly. A second gas cylinder valve removal tool includes a body portion including a bore extending therethrough, the body portion including means adapted for mounting the body portion on a gas cylinder valve assembly, and a stem portion sized to be received in the bore and including a pin extending from one end, the pin including means adapted for unscrewing a valve from a valve assembly. Advancement of the stem portion relative to the body portion, when the body portion is mounted on a gas cylinder valve assembly, removes a valve from the valve assembly.

According to another embodiment according to the present invention, a process for removing a valve from a valve assembly of a compressed gas cylinder comprises the steps of mounting a gas cylinder valve removal tool on the gas cylinder, advancing a portion of the gas cylinder valve removal tool until it impinges upon the valve, and further advancing the portion of the gas cylinder valve removal tool to remove the valve.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which:

FIG. 4 is an elevational view of a second embodiment of a valve removal tool according to the present invention;

FIG. 5 is a bottom plan view of the embodiment illustrated in FIG. 4;

FIG. 6 is a cross-sectional view along line 6—6 in FIG. 5;

FIG. 7 is a bottom plan view of yet another embodiment of a valve removal tool according to the present invention;

FIG. 8 is an elevational view of a fourth embodiment of a valve removal tool according to the present invention; and FIG. 9 is a bottom plan view of the embodiment illustrated in FIG. 8.

DESCRIPTION OF THE PREFERRED EMBODIMENTS

Compressed gas cylinder valve removal tools and processes for removing compressed gas cylinder valves according to the present invention provide a simple way of ensuring that there is no residual compressed gas in a compressed gas cylinder, preferably a NRC, by providing visual evidence of the removal of the cylinder valve.

Figure 1:
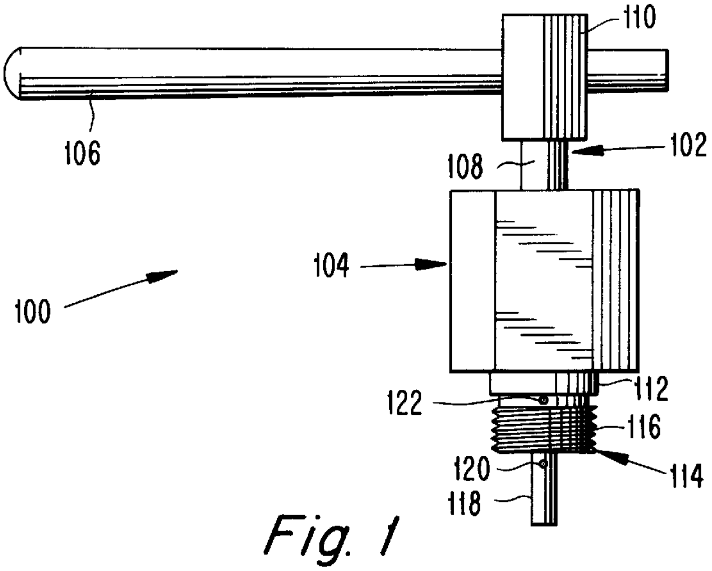
FIG. 1 is an elevational view of a first embodiment of a valve removal tool according to the present invention.

FIG. 1 illustrates a first embodiment of a valve removal tool 100 according to the present invention. Valve removal tool 100 includes a center punch 102 and a body 104. Center punch 102 includes a handle portion 106, a stem portion 108, and a head portion 110 joining together the stem and the handle.

Body 104 is generally cylindrically shaped, although any geometric shape may be alternatively used without departing from the spirit and scope of the invention. Body 104 includes a reduced portion 112, and a threaded portion 114 including threads 116. Body 104 further includes a center bore 128 extending through the entire length of the body. Bore 128 includes a first, unthreaded portion 132, and a second, threaded portion 130. The internal diameter at first, unthreaded portion 132 is smaller than that at second, threaded portion 130, for reasons which will be explained in greater detail below. Pressure relief port 122 extends through the wall of body 104, fluidly communicating bore 128 with the exterior of the body.

Center punch 102 further includes a threaded portion 124 including threads 126. The outermost extent of threads 126 is greater than the outer diameter of stem 108, for reasons which will be explained in further detail below. Center punch 102 further includes a pin 118 on the end opposite from head 110. Pin 118 includes a center bore 119, which leads to transverse gas vent port 120. Gas vent port 120 extends through the side wall of pin 118 to communicate bore 119 with the exterior of pin 118.

Threads 126 and the threads of threaded portion 130 are constructed to mate. The outer diameter of stem 108 is slightly smaller than the unthreaded portion 132 of body 104. Accordingly, when assembled, center punch 102 is restricted to travel within bore 128 by unthreaded portion 132 and head 110.

Figure 2:
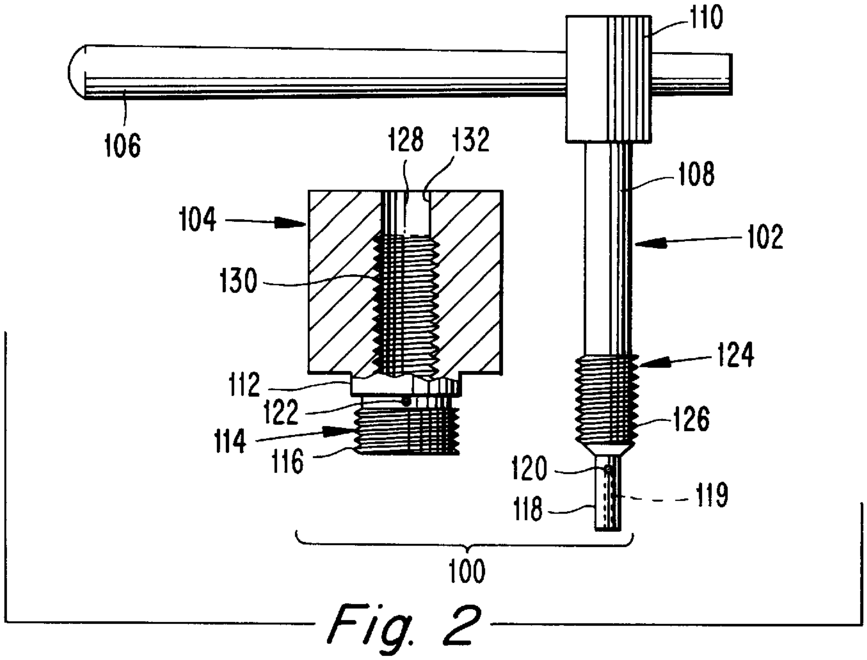
FIG. 2 is an elevational view of the embodiment illustrated in FIG. 1, partially in cross-section.
Figure 3:
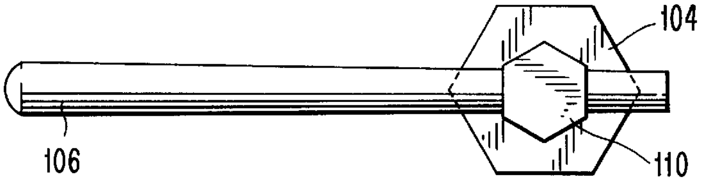
FIG. 3 is a top plan view of the embodiment illustrated in FIG. 1.

The operation of the valve removal tool 100 will now be explained with reference to FIGS. 1–3. Body 104, with center punch 102 mounted therein as illustrated in FIG. 1, is placed over the top of an internally threaded coupling of a compressed gas cylinder valve assembly (not shown). Such gas cylinders include 6D, 8AL, and 6DM type cylinders. With threaded portion 114 advanced fully within the mating portion of the compressed gas cylinder valve assembly (not shown), handle 106 is rotated to advance center punch 102 in a direction towards the end of body 104 nearest threads 116. As center punch 102 is rotated by turning handle 106, pin 118 advances down into the valve assembly (not shown) to make contact with the valve assembly. Upon further turning of handle 106 and advancement of center punch 102, pin 118 pushes out the valve element (not shown) of the valve assembly (not shown), and into the compressed gas cylinder. The compressed gas cylinder then presents a hole where the cylinder valve had been mounted, providing visual evidence that the cylinder does not contain residual compressed gas pressure.

During this process, the venting of any residual compressed gas within the compressed gas cylinder is accomplished by means of bore 119, gas vent port 120, and pressure relief port 122. Gas within the compressed gas cylinder (not shown) is allowed to escape past the ruptured valve and to come into contact with bore 119. Gas then exits bore 119 through gas vent port 120, travels around the outside of threads 126 and inside of threads 130, to pressure relief port 122. As can be readily appreciated from FIGS. 1 and 2, pressure relief port 122 is located above threaded portion 114, such that gas escaping from pressure relief port 122 is free to exit to atmosphere.

The valve removal tool 100 is designed to withstand the full gas pressure which would accompany removing a valve from a full compressed gas cylinder. For example, in a type 6D cylinder, up to 1,000 psi (6896 kPa) of gas pressure can be vented through the valve removal tool 100, while still punching the valve (not shown) from the valve assembly (not shown), without risk of valve removal tool 100 coming loose from the compressed gas cylinder valve assembly.

FIGS. 4–6 illustrate a second embodiment of a valve removal tool 200 according to the present invention. Valve removal tool 200 includes a center punch 202 and a body 204. Center punch 202 includes a stem 208 and a handle 206, connected to the stem at a head 210. As illustrated in FIG. 5, body 204 may be formed of a hexagonal stock material; however, any shape of body 204 may be used without departing from the spirit and scope of the invention.

FIG. 5 illustrates a bottom view of the valve removal tool 200 illustrated in FIG. 4. Body 204 includes gas vent ports 222 through the exterior wall thereof. Body 204 includes a cavity 220 (see also FIG. 6) which includes threaded internal surface 224, the purpose of which will be described in further detail below.

FIG. 6 illustrates a cross-section along line 6—6 in FIG. 5. Center punch 202 includes a threaded shaft portion 212, and body 204 includes a threaded bore portion 214. Threaded shaft portion 212 mates with threaded bore portion 214. Body 204 includes a shoulder 216, which joins threaded bore portion 214 with cavity 220.

Center punch 202 includes a shoulder 226 which extends out beyond the outer diameter of threaded shaft portion 212, for reasons which will be explained more fully below. Center punch 202 further includes a pin 218, which includes a bore 228 leading to a transverse gas release vent 230. As best seen in FIGS. 4 and 5, pin 218 includes a first cutout 232 and a second cutout 234 for mating with corresponding portions of a valve, e.g. a Schrader valve.

Shoulder portion 226 prevents center punch 202 from travelling up too far within body 204. Shoulder 226 is provided to limit the range of motion of center punch 202 in a first direction away from pin 218, and handle 206 limits the range of motion of the center punch in the other direction toward pin 218.

Operation of the embodiment illustrated in FIGS. 4–6 will now be described. Body 204 is placed over an externally threaded portion of a valve assembly (not shown), threaded internal surface 224 mating with threads on the external surface of the valve assembly (not shown). One such gas cylinder is a 7 EOC or 7HP type cylinder, with a CGA 600 cylinder fitting. Center punch 202, mounted in body 204, is advanced towards the valve assembly by turning handle 206. When handle 206 is rotated to advance center punch 202 in the direction of pin 218, first and second cutouts 232, 234 mate with corresponding portions on the valve within the valve assembly. Further turning of handle 206 advances center punch 202 and pin 218 into the valve assembly (not shown), while simultaneously first cutout portion 232 and second cutout portion 234 unscrew the valve within the valve assembly, until the valve is screwed out of the valve assembly and falls into the compressed gas cylinder. The compressed gas cylinder then presents a hole where the cylinder valve had been mounted, providing visual evidence that the cylinder does not contain residual compressed gas pressure.

During this operation, residual gas within the compressed gas cylinder (not shown) is allowed to escape to atmosphere through a gas path provided through valve removal tool 200. Gas from the interior of compressed gas cylinder escapes past the valve which is being rotated by pin 218 and first and second cutouts 232, 234, enters bore 228, and exits bore 228 at gas release vent 230. The gas then is free to vent to atmosphere through gas vent ports 222 after travelling through cavity 220. Accordingly, any residual gas remaining in compressed gas cylinder may be safely vented to atmosphere during the removal of the valve from the valve assembly.

Valve removal tool 200 is designed to withstand the full gas pressure which would accompany removing a valve from a valve assembly of a full, compressed gas cylinder. For example, in a 7 EOC or 7 HP type cylinder, up to 500 psi (3448 kPa) of gas pressure can be vented through the valve removal tool 200, while still unscrewing the valve (not shown) from the valve assembly (not shown), without the risk of valve removal tool 200 coming loose from the compressed gas cylinder valve assembly.

FIG. 7 illustrates a bottom end view of a third, alternative embodiment of the invention similar to valve removal tool 200 illustrated in FIGS. 4–6. FIG. 7 illustrates a pin 240, which may be used instead of pin 218 in the embodiment illustrated in FIGS. 4–6. Pin 240 is a solid pin and includes one or more outer grooves 242 which perform the function of venting gas past pin 240 while the pin is impinged against the valve of a valve assembly (now shown). Different from the embodiment illustrated in FIGS. 4–6, the embodiment illustrated in FIG. 7 does not disassemble the gas cylinder valve assembly. Pin 240 does not unscrew the valve element from the valve assembly; pin 240 is used to punch out the valve from the valve assembly, similar to the embodiment illustrated in FIGS. 1–3. Similar to the embodiment illustrated in FIGS. 1–3, pin 240 may be attached to a threaded portion of a center punch (not shown). During a process of punching out a valve from a valve assembly, gas is free to vent past pine 240 through groove or grooves 242. After passing the exterior of pin 240 through groove or grooves 242, gas from a compressed gas cylinder enters into a cavity similar to cavity 220 and escapes to atmosphere via gas vent ports similar to gas vent ports 222.

FIGS. 8 and 9 illustrate a fourth embodiment of a valve removal tool 300 according to the present invention. Valve removal tool 300 includes a center punch 302 and a body 304. Body 304 is substantially similar to body 204 illustrated in FIGS. 4–6, discussed in greater detail above. Center punch 302 is similar to center punch 202 illustrated in FIGS. 4–6, discussed in greater detail above. Center punch 302, however, includes an elongated handle 306 including an enlarged portion 308 which is easily gripped by the hand of a user. Center punch 302 threads into body 304 in a manner similar to center punch 202 and body 204.

Center punch 302 includes a solid pin 310 extending at one end of the center punch, and a threaded portion 312. Pin 310 includes a cup 314 on the end thereof for engaging with and seating on a corresponding portion on a valve of a valve assembly of a compressed gas cylinder (not shown). The outer diameter of pin 310 is preferably undersized relative to an inside diameter of the valve in which valve removal tool 300 is inserted, thereby allowing for any residual gas within the compressed gas cylinder to escape past pin 310. Once gas has escaped past pin 310, it exits body 304 through gas vent port 316.

Operation of the embodiment illustrated in FIGS. 8 and 9 will now be described. Body 304 is placed over an externally threaded portion of a valve assembly (not shown), threaded internal surface 318 mating with threads on the external surface of the valve assembly (not shown). One such gas cylinder is a 7 EOC or 7HP type cylinder, with a CGA 600 cylinder fitting. With threaded portion 318 advanced fully relative to the mating portion of the compressed gas cylinder valve assembly (not shown), handle 306 is further rotated to advance center punch 302 and pin 310 in a direction towards the end of body 304 away from handle 306. As center punch 302 is rotated by turning handle 306, pin 310 advances down into the valve assembly (not shown) to make contact with the valve assembly. Upon further turning of handle 306 and advancement of center punch 302, pin 310 pushes out the valve element (not shown) of the valve assembly (not shown), and into the compressed gas cylinder. The compressed gas cylinder then presents a hole where the cylinder valve had been mounted, providing visual evidence that the cylinder does not contain residual compressed gas pressure.

Yet another embodiment of the present invention includes a kit for removing valves from compressed gas cylinders of numerous types. Several valve removal tools according to the present invention may be packaged together and shipped to the users of compressed gas cylinders, who may then punch out or unscrew the valves of the cylinders' valve assemblies. In a preferred embodiment, valve removal tools similar to those illustrated in FIGS. 1–3, 4–6, 7, and 8–9 may be packaged together in a kit with appropriate instructions, thus enabling the end user to remove the valve out of numerous types of gas cylinders using the one kit. Thus, a kit according to the present invention allows the end user to ensure that all gas is vented from a used compressed gas cylinder, and may transport and recycle the used, empty cylinder as non-hazardous material, thus greatly decreasing the costs associated with handling the cylinder.

While the invention has been described in detail with reference to preferred embodiments thereof, it will be apparent to one skilled in the art that various changes can be made, and equivalents employed, without departing from the scope of the invention.

What is claimed is:

1. A gas cylinder valve removal tool comprising:

a body portion having a first end and a second end and including a bore extending through said body portion from said first end to said second end, said body portion including means for mounting said body portion on a gas cylinder valve assembly;

a stem portion including a first end and a second end, said stem portion first end having a pin to engage and punch out said valve, said stem portion received in said bore with said stem portion second end in said body portion second end;

said stem portion and said body bore including mating threaded portions;

said means for mounting comprising a gas cylinder mating portion including a threaded outer surface at said second end of said body portion for mating with corresponding portions of a gas cylinder valve assembly;

wherein advancement of said stem portion relative to said body portion, when said body portion is mounted on a gas cylinder valve assembly, removes a valve from said valve assembly.

2. A gas cylinder valve removal tool according to claim 1, wherein said pin further comprises a center bore extending from one end thereof, and a transverse gas vent communicating said center bore with an exterior of said pin.

3. A gas cylinder removal tool according to claim 1, wherein said body portion further comprises means for retaining said stem in said body bore.

4. A gas cylinder removal tool according to claim 1, wherein said body further comprises a pressure relief port communicating said body bore with an exterior of said body.

5. A gas cylinder removal tool according to claim 1, further comprising means for venting gas through said stem, around said stem, and through said body.

6. A gas cylinder removal tool according to claim 1, wherein said stem further comprises a handle.

7. A gas cylinder removal tool according to claim 1, wherein said gas cylinder mating portion further comprises a reduced portion, said reduced portion comprising said threaded outer surface.

8. A gas cylinder removal tool according to claim 1, wherein said body bore further comprises a first threaded portion having a first internal cross-sectional dimension and a second threaded portion having a second internal cross-sectional dimension greater than said first internal cross-section dimension.

9. A gas cylinder removal tool according to claim 1, wherein said stem portion further comprises a first threaded portion defining a first outer diameter, and a shoulder defining a second outer diameter, said second outer diameter being greater than said first outer diameter for retaining said stem in said bore.

10. A gas cylinder removal tool according to claim 1, wherein said stem portion further comprises a pin extending from one end, said pin including means for unscrewing a valve from a valve assembly.

11. A gas cylinder removal tool according to claim 10, wherein said means for unscrewing a valve comprises at least one cutout for mating with corresponding portions on said valve.

12. A gas cylinder removal tool according to claim 1, wherein said stem further comprises a pin for punching out said valve, said pin comprising at least one groove on an external portion of said pin to allow gas within a gas cylinder to vent past said pin.

13. A gas cylinder removal tool according to claim 1, wherein said stem further comprises a pin for punching out said valve, said pin comprising a cup at one end of said pin for seating on a portion of a said valve.

14. A gas cylinder valve removal kit comprising:

a first gas cylinder valve removal tool including a body portion including a bore extending therethrough, said body portion including means adapted for mounting said body portion on a gas cylinder valve assembly, a stem portion sized to be received in said bore and including a pin adapted to engage and punch out said valve, wherein advancement of said stem portion relative to said body portion, when said body portion is mounted on a gas cylinder valve assembly, removes a valve from said valve assembly; and a second gas cylinder valve removal tool including a body portion including a bore extending therethrough, said body portion including means adapted for mounting said body portion on a gas cylinder valve assembly, a stem portion sized to be received in said bore and including a pin extending from one end, said pin including means adapted for unscrewing a valve from a valve assembly, wherein advancement of said stem portion relative to said body portion, when said body portion is mounted on a gas cylinder valve assembly, removes a valve from said valve assembly.

15. A gas cylinder valve removal tool, comprising:

a body portion including a bore extending therethrough, said body portion including means for mounting said body portion on a gas cylinder valve assembly;

a stem portion sized to be received in said bore and including a pin to engage and punch out said valve, said pin comprising a center bore extending from one end thereof, and a transverse gas vent communicating said center bore with an exterior of said pin;

wherein advancement of said stem portion relative to said body portion, when said body portion is mounted on a gas cylinder valve assembly, removes a valve from said valve assembly.

16. A gas cylinder removal tool, comprising:

a body portion including a bore extending therethrough, said body portion including means for mounting said body portion on a gas cylinder valve assembly and a pressure relief port communicating said body bore with an exterior of said body;

a stem portion sized to be received in said bore;

wherein advancement of said stem portion relative to said body portion, when said body portion is mounted on a gas cylinder valve assembly, removes a valve from said valve assembly.

17. A gas cylinder removal tool, comprising:

a body portion including a bore extending therethrough, said body portion including means for mounting said body portion on a gas cylinder valve assembly;

a stem portion sized to be received in said bore;

means for venting gas through said stem, around said stem, and through said body;

wherein advancement of said stem portion relative to said body portion, when said body portion is mounted on a gas cylinder valve assembly, removes a valve from said valve assembly.

* * * * *